United States Patent [19]

Ihara

[11] 4,320,002
[45] Mar. 16, 1982

[54] FILTER DEVICE

[76] Inventor: Makoto Ihara, 16-4, Nishikamata 5-chome, Ohta-ku, Tokyo 104, Japan

[21] Appl. No.: 147,007

[22] Filed: May 6, 1980

[30] Foreign Application Priority Data

May 8, 1979 [JP] Japan .............................. 54-60185[U]

[51] Int. Cl.³ .............................................. B01D 33/06
[52] U.S. Cl. .................................. 210/178; 210/213; 210/394; 210/403
[58] Field of Search ........ 210/402, 403, 178, 184–186, 210/194–196, 210, 211, 213, 214, 332, 391, 394, 395

[56] References Cited

U.S. PATENT DOCUMENTS

| | | | |
|---|---|---|---|
| 2,416,499 | 2/1947 | Saxe | 210/403 X |
| 2,795,635 | 6/1957 | McBride | 210/211 X |
| 2,804,210 | 8/1957 | Shaughnessy | 210/394 |
| 3,485,378 | 12/1969 | Regel | 210/403 X |
| 3,779,911 | 12/1973 | Freudenthal et al. | 210/213 X |
| 3,802,566 | 4/1974 | Hata | 210/402 X |

*Primary Examiner*—Thomas G. Wyse
*Attorney, Agent, or Firm*—Jordan and Hamburg

[57] ABSTRACT

A cleaning filter has a cylindrical tank through which an axial pipe extends, the pipe having a screw blade attached thereon and being rotatable in the tank. A drum rotatably carried on the axial pipe is disposed within the tank and around the screw blade, the drum having a cylindrical body and an end cover mounted on the cylindrical body such that the cylindrical body is rotatable relative to the end cover. The end cover has a cleansing agent inlet and a cleansing agent outlet with the cleansing agent being removed from the drum by rotating the pipe means and the screw blade, the latter engaging the cleansing agent in the drum to thereby move the cleansing agent axially to the cleansing agent outlet. A filter is disposed on the outer periphery of the cylindrical body of the drum so that when the liquid to be cleaned flows into the tank from an inlet and is discharged through an outlet on the axial pipe, the liquid passes through the filter and the cleansing agent in the drum to thereby remove impurities from the liquid.

10 Claims, 2 Drawing Figures

FILTER DEVICE

BRIEF SUMMARY OF THE INVENTION

The present invention relates to a filter device that cleans and purifies washing liquid used in dry cleaning for cleaning clothes and waste discharge from foodstuff factories and public bath houses, etc.

Perchloroethylene (detergent) for use in cleaning and washing, for instance, in dry cleaning, has hitherto deprived the clothing of its dirt in the cleaning drum. This perchloroethylene removes dirt within the washer utilizing activated carbon, etc. as a cleansing agent and this detergent is returned into the cleaning drum. In this device, however, foreign matter such as oily dirt, fabric waste, etc. as well as ordinary dirt often comes out into the washing liquid at the time of cleansing action, and this foreign matter causes the washer to clog and becomes a big detrimental factor considerably reducing the cleansing action of the washer.

This foreign matter has customarily been removed by placing sand into a drum can, etc. and pouring detergent therein. The filtering surface in this drum can is merely an area surrounded by the interior wall even at maximum, so that a high filtration rate is not attained. In addition, this device utilizing such sand for filtration is very inconvenient to disassemble in case of repair because the weight of sand is great, and when it takes so much time to disassemble, the operator is very liable to be exposed to a harmful perchloroethylene atmosphere thereby affecting his health.

OBJECTS OF THE INVENTION

An object of the present invention is to provide a filter device that can achieve filtration very efficiently for long periods by widening the area of filtration for the purpose of filtering liquids, oily dirt, waste thread, etc.

Another object of the present invention is to provide such a filter device as being capable of removing clogged material with ease by reverse washing even when the filter cloth becomes clogged.

Furthermore, another object of the present invention is to furnish a filter device that can simply and easily provide for changing the cleansing agents.

OUTLINE OF THE INVENTION

The special features of the present invention lie wherein a flow inlet for a liquid is provided in an enclosed tank mounted at a fixed position, and at one side of the tank are provided respectively an intake for a detergent and a drainage outlet combined for use to discharge cleansing agents. An axial pipe passing through the tank is provided supporting the tank in a manner free to turn, the axial pipe having outflow holes communicating with the flow inlet. A drum is situated on the axial pipe to freely rotate thereon, the drum including a cylindrical body and a cover body with openings at one end respectively, into which the cleansing agent is charged and through which liquids can circulate. A bellows type filter cloth is affixed on the outer peripheral surface of the cylindrical body, and the cover body is provided with an entrance and an exit for cleansing agents respectively as corresponded with the intake and the drainage outlet. A screw blade is attached on the outer peripheral part of the axial pipe, which can be turned by rotation of this pipe. The cylindrical body is provided with a a reverse washing means for performing reverse washing action. The cylindrical body and the cover body are fitted and joined to each other with the purpose that their openings are revolvable, and this cover body is fixed by a fixing means.

BRIEF DESCRIPTION OF DRAWINGS

The characteristics of the present invention will be comprehended more readily by the following explanation using the drawings for reference. The attached drawings are as follows.

DETAILED DESCRIPTION

Figure 1:
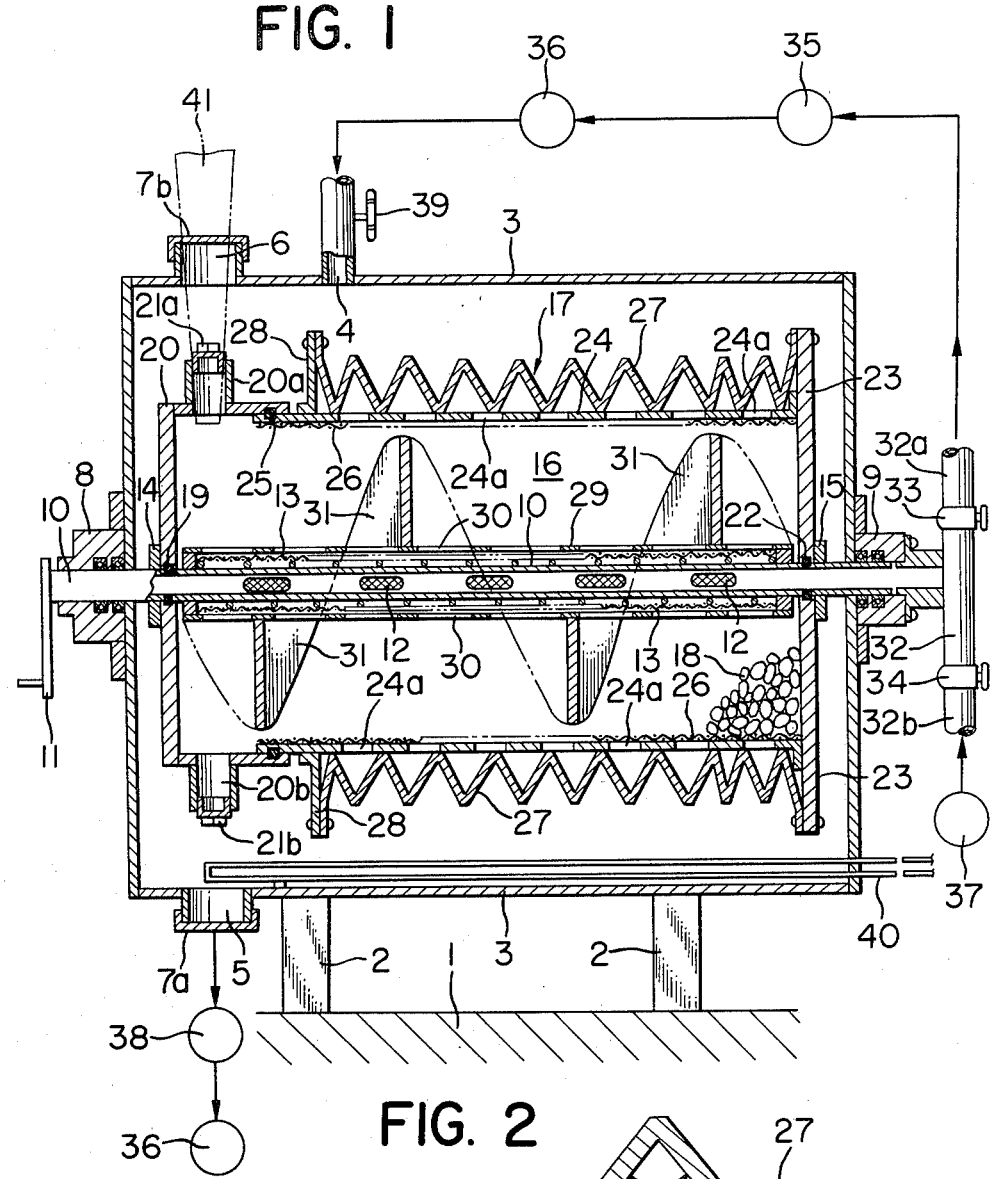
FIG. 1 is a sectional view.

Now an explanation is made regarding the case in which the present invention is applied to a dry cleaning device. As shown in FIG. 1, an enclosed type tank 3 is mounted on a base 1 by means of legs 2, 2. This tank 3 is provided with a flow inlet for liquid 4 at an upper portion and a drainage outlet 5 at a lower portion. At one side (left) on the upper part of the tank 3 is provided an intake 6 for cleansing agents, and the intake 6 and the flow inlet 4 are positioned on the same side. 7a is a cap to cover the drainage outlet 5 and 7b is a cap for the intake 6.

In the tank 3, there is an axial pipe 10 rotatably supported by bearings 8, 9 having ball bearings at the center on both front and back sides. One end (right) of this axial pipe 10 is open and the other end thereof is closed to which a handle 11 is installed. On the peripheral part of the axial pipe 10 are provided many long slits 12 or holes for outflow, and a wire netting 13 is affixed on the outer part of this axial pipe. The axial pipe 10 holds in position washers 14, 15, and a supporting drum 17 having a cleaning chamber 16 inside, the drum 17 being independently rotatable relative to the pipe 10. The cleaning chamber 16 is charged with activated carbon 18 for use as a cleansing agent.

Now an explanation is given of the concrete construction of the drum 17. At one side of the washer 14, a cover body 20 having a U-shape in section is supported to be freely rotatable on the axial pipe 10 through a O ring 19, and two entrances 20a, 20b for the activated carbon 18 are provided at positions corresponding with the intake 6 and drainage outlet 5 on the tank 3, and these entrances are usually closed by inserting plugs 21a, 21b. At the washer 15 on other side, a disc type side plate 23 is supported free to rotate on the axial pipe 10 through an O ring 22. On the outer circumference of this side plate 23 is mounted a cylindrical body 24. And an opening of the cover body 20 and an opening of the cylindrical body 24 are fitted together so as to rotate freely with each other through an O ring 25. The drum 17 is thus composed by joining of the cover body 20 and the cylindrical body 24. Many thin holes 24a are perforated on the cylindrical body 24, and an inner surface of the body is covered with a wire netting 26.

Figure 2:
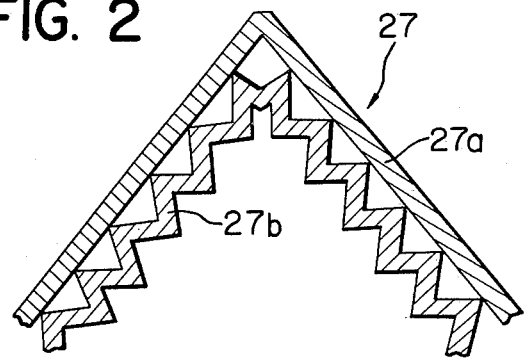
FIG. 2 is an enlarged sectional view of a filter cloth.

A filter cloth 27 is applied on the outer periphery of the cylindrical body 24, both ends of which are securely fixed on a mounting plate 28 projecting out of the cylindrical body and on the side plate 23 respectively. The filter cloth 27 is undulated in a bellows shape. As shown in FIG. 2, the filter cloth for use should preferably be made of a hard filter cloth 27a and a folded filter cloth 27b laminated and strongly joined together. An outer pipe 29 is securely fixed on the axial pipe 10, and on the peripheral part are provided many permeable holes 30.

The outer pipe 29 is equipped with a screw blade 31. By rotating the handle 11, accordingly, the screw blade 31 can be turned together with the axial pipe 10.

The right end of the axial pipe 10 is connected to a branch pipe 32 outside the tank 3, to which valves 33, 34 are attached. A pipe 32a at one side is connected to a cleaning tank 36 through a pump 35, and this cleaning tank is connected to the flow inlet 4 of tank 3 constituting a circulating flow passage. A pipe 32b at the other side is connected to a compressor 37, from which high pressure air can be sent. The drainage outlet 5 is connected to a distillatory 38, which is in turn connected to the cleaning tank 36. 39 is a valve for the flow inlet 4 and 40 is a cooling pipe. 41 is a funnel to let the activated carbon 18 pour from the intake 6 of tank 3 into the drum by way of entrance 20a of drum 17. When the funnel 41 is located between the intake 6 and the entrance 20a, the funnel 41 serves to fix the cover body 20 to the tank 3. The cover body 20 may otherwise be fixed on the inside wall of the tank 3 by an appropriate means.

An explanation will now be given in connection with the action of the present invention.

In such a state as shown in FIG. 1, the opened valve 39 of flow inlet 4 allows the after-washing-liquid to flow into the tank 3 from the cleaning tank 36. Any fabric waste in the liquid is then removed by means of filter cloth 27, and dirt or defilement is eliminated by the activated carbon 18 in the cleaning chamber 16. As a result, the liquid is purified into clean water and is led to branch pipe 32 after passing through the wire netting 13 of axial pipe 10. Then, while valve 33 of pipe 32a is open, the valve 34 of the pipe 32b is closed. For this reason, the clean water is supplied again into the cleaning tank 36 by means of pump 35 and serves to wash the clothes. Cooling pipe 40 in which cooling water is circulating prevents deterioration of the detergent in the cleansing water. Since the cloth filter 27 is of a bellows type, moreover, the filtering area is considerably wider thus resulting in a higher efficiency of filtration.

When the filter cloth 27 is clogged due to adherence of the fabric waste, reverse washing will be effected to get rid of the fabric waste. For this purpose the valve 39 of flow inlet 4 is closed and the valve 33 of pipe 32a is shut. Then, the valve 34 of the pipe 32b is opened. Screw blade 31 is rotated by rotating handle 11, with which the drum follows by the frictional force of the activated carbon 18 charged in the drum 17. By this action, high pressurized air is forced into the drum 17 through the slits 12 of axial pipe 10 by means of compressor 37. Accordingly, cleansing water in the cleaning chamber 16 flows in reverse direction under high pressure air to wash the activated carbon. The cleansing water passes through filter the cloth 27 by way of the wire netting 26 and the slits 24a, and forcibly allows the texture of the filter cloth to widely open to eliminate particles attached thereon. Therefore, the fabric waste separated from the filter cloth 27 comes to float in the cleansing water, and the cleansing water flows for distillation from the drainage outlet 5 into the distillatory 38 and is sent again to the cleaning tank 36 for reuse. Air supplied by reverse washing action then enters into the cleaning tank 36 and is discharged to the atmosphere through ducts of the tank.

Next, an explanation is made for the replacing the activated carbon 18 after it has been deteriorated. After the cleansing water is discharged outside of the tank 3 through the drainage outlet 5, the intake 6 of the tank 3 and the entrances 20a, 20b of the cover body 20 are opened, and then the funnel 41 is inserted through the intake 6 into the entrance 20a corresponding with the intake, as shown by double dot-dash lines in FIG. 1. The cover body 20 is then held and fixed on tank 3 by funnel 41. When the handle 11 is turned in this state, the cylindrical body 17 is rotated together with the screw blade 31 against the cover body 20 because of the frictional force of the activated carbon. As a result, the activated carbon 18 within the cleaning chamber 16 is evacuated through the downward exit 20b and the drainage outlet 5. When the activated carbon 18 in the cleaning chamber 16 runs low, then the cylindrical body 24 stops as set free from the frictional force with the activated carbon, and only the screw blade 31 rotates. Rotation of this screw blade 31 causes the activated carbon 18 to move toward the exit 20b, and all the activated carbon material is thus discharged.

After completion of discharge of the activated carbon 18, only the downward exit 20b is closed. The screw blade 31 is made to rotate while new activated carbon is being accommodated into the cleaning chamber 16 through funnel 41. The activated carbon 18 is further moved deeply into the cleaning chamber 16 by rotation of the screw blade 31, and when the cleaning chamber is filled to a certain extent with activated carbon, then the activated carbon possesses a great frictional force relative to the cylindrical body 24, and the cylindrical body slips and rotates O ring 25 which is located between this cylindrical body 24 and cover body 20. Accordingly, the activated carbon can uniformly be placed and fully charged in the cleaning chamber 16. After charging of the activated carbon, funnel 41 is pulled out, and the entrance 20a and intake 6 are closed respectively. Thereafter, the valve 39 for the flow inlet 4 is opened thus resuming cleaning action for the cleansing water.

According to the experimental example in connection with the replacing work of the activated carbon, it reveals that the drum 17 of longer size, for example, 1,200 mm or over has had an excellent effect upon the replacement.

If the cover body 20 is of a type which is prefixed in the tank 3, the only thing to do is to insert funnel 41 into intake 6 when placing the activated carbon 18 into drum 17.

What I claim is:

1. A cleaning filter device comprising:

a cylindrical tank having an inlet for liquid to be cleaned, an intake on said tank for a cleansing agent, and a discharge outlet on said tank for said cleansing agent, axial pipe means extending through said tank, said pipe means having a handle at one end to rotate said pipe means freely relative to said tank, and a plurality of holes in said pipe means, said pipe means having an operating outlet extending externally of said tank, a screw blade attached to said pipe means to rotate together with said pipe means;

a drum rotatably carried on said axial pipe means and disposed within said tank and around said screw blade, said drum having a cylindrical body and an end cover mounted on said cylindrical body such that said cylindrical body is rotatable relative to said end cover, said cylindrical body having a plurality of flow openings, said end cover having a cleansing agent inlet and a cleansing agent outlet, said cleansing agent being removed from said drum by rotating said pipe means by said handle to thereby rotate said screw blade which engages the cleansing agent in said drum to thereby move said cleansing agent axially to said cleansing agent outlet, and filter means disposed on the outer periphery of said cylindrical body of said drum so that when liquid to be cleaned flows into said tank through said tank inlet and is discharged through said operating outlet, said liquid passes through said filter means and said cleansing agent in said drum to thereby remove impurities from the liquid.

2. A cleaning filter according to claim 1 wherein said pipe means comprises an inner pipe disposed within an outer pipe, said inner and outer pipe each having a plurality of openings for liquid to pass therethrough, and a wire netting between said inner and outer pipes to prevent the cleansing agent in said drum from flowing out through said pipe means.

3. A cleaning filter according to claim 2 wherein said inner pipe has a first longitudinal end extending through said drum and through said tank to receive said handle and a second longitudinal end extending through said drum and through said tank to define said operating outlet.

4. A cleaning filter according to claim 1 further comprising a circulatory pump means receiving cleaned liquid from said operating outlet and circulating said cleaned liquid back to said tank inlet after said cleaning liquid performs its cleansing function.

5. A cleaning filter according to claim 1 further comprising a source of air supply leading to said operating outlet for conducting pressurized air in a reverse direction to thereby cleanse said cleansing agent and said filter means as reverse flow passes through said drum, through said filter means in said reverse direction and exits said tank through said tank discharge outlet.

6. A cleaning filter according to claim 1 wherein said drum is rotatably mounted on said pipe means by rotatable means, said rotatable means utilizing an O-ring as a seal.

7. A cleaning filter according to claim 1 wherein said cylindrical body of said drum is rotatably mounted on said end cover of said drum by rotatable means, said rotatable means utilizing an O-ring as a seal.

8. A cleansing filter according to claim 1 further comprising cooling means in said tank for cooling the liquid in said tank to prevent deterioration of detergent in the cleaning liquid.

9. The cleaning filter according to claim 1 wherein said filter means comprises a filter cloth having an external bellows-type configuration.

10. A cleaning filter according to claim 1 wherein said end cover of said drum is rotatable so that said cleansing agent inlet on said end cover is aligned with said inlet on said tank, whereby a filling member is adapted to be inserted in said aligned tank inlet and drum inlet to thereby preclude rotation of said end cover relative to said tank, whereby cleansing agent can be passed into said drum and fed axially into the drum by rotating said handle which in turn rotates said pipe means and said screw blade.

* * * * *